United States Patent [19]
Shiro

[11] Patent Number: 5,490,510
[45] Date of Patent: Feb. 13, 1996

[54] DIAGNOSTIC ULTRASOUND APPARATUS

[75] Inventor: Kazuhiro Shiro, Tokyo, Japan

[73] Assignee: Aloka Co., Ltd., Japan

[21] Appl. No.: 424,040

[22] Filed: Apr. 18, 1995

[51] Int. Cl.⁶ .................................................. A61B 8/00
[52] U.S. Cl. ....................................................... 128/660.07
[58] Field of Search ......................... 128/660.04, 660.07, 128/661.01, 661.08, 661.09, 661.10, 662.06

[56] References Cited

U.S. PATENT DOCUMENTS

| | | | |
|---|---|---|---|
| 5,199,437 | 4/1993 | Langberg | 128/661.01 |
| 5,211,169 | 5/1993 | Freeland | 128/661.10 |
| 5,257,629 | 11/1993 | Kitney et al. | 128/662.06 |

*Primary Examiner*—George Manuel
*Attorney, Agent, or Firm*—Marger, Johnson, McCollom & Stolowitz

[57] ABSTRACT

A diagnostic ultrasound apparatus includes an ultrasound probe for transmitting and receiving ultrasound waves to and from a patient to obtain echo data of the patient, an echo data memory in which the echo data are to be written by being identified with addresses S, B represented by a polar coordinate system, a frame memory in which the echo data read out from the echo data memory are to be written according to first addresses X, Y represented by a rectangular coordinate system, and an address generator for sequentially generating the first addresses X, Y which are used when the echo data are written into the frame memory. The apparatus further includes an address converting section for converting the addresses X, Y generated by the address generator into the polar coordinate addresses R, θ. The address conversion is carried out based upon addresses x, y of a representative quadrant which is one of a plurality of quadrants of a second rectangular coordinate system which is obtained by converting the first rectangular coordinate system so as to correspond to the polar coordinate system, and quadrant discriminating information which discriminates which of the plurality of quadrants the representative quadrant belongs to. As a result, the echo data are read out from the echo data memory in accordance with the converted polar coordinate addresses R, θ which are supplied from the address converting section, and thus readout echo data are written into the frame memory. Therefore, in this apparatus, since the address conversion from the addresses X, Y to the addresses R, θ is performed based upon the addressed x, y of the representative quadrant and the quadrant discriminating information extracted from the X, Y addresses, the storage capacity of the address conversion table can be greatly reduced

18 Claims, 8 Drawing Sheets

DIAGNOSTIC ULTRASOUND APPARATUS

OUTLINE OF THE CONTENTS OF THE ECHO DATA MEMORY

RELATIONSHIP BETWEEN ADDRESS X,Y AND ADDRESS x,y

|  | INPUT | | OUTPUT | | |
|---|---|---|---|---|---|
|  | $Y_8$ | $X_8$ | Q | $B_8$ | $B_9$ |
| I | 0 | 1 | 0 | 0 | 0 |
| II | 0 | 0 | 1 | 1 | 0 |
| III | 1 | 0 | 0 | 0 | 1 |
| IV | 1 | 1 | 1 | 1 | 1 |

FIG. 9

Point A        (QUADRANT I)

$\begin{cases} X=258 \text{ (102H)} \rightarrow x=2 \text{ (02H)} \\ Y=4 \text{ (004H)} \rightarrow y=251 \text{ (FBH)} \end{cases}$ Point B        (QUADRANT II)

$\begin{cases} X=3 \text{ (003H)} \rightarrow x=252 \text{ (FCH)} \\ Y=2 \text{ (002H)} \rightarrow y=253 \text{ (FDH)} \end{cases}$ Point C        (QUADRANT III)

$\begin{cases} X=253 \text{ (0FDH)} \rightarrow x=2 \text{ (02H)} \\ Y=257 \text{ (101H)} \rightarrow y=1 \text{ (01H)} \end{cases}$ Point D        (QUADRANT IV)

$\begin{cases} X=508 \text{ (1FCH)} \rightarrow x=252 \text{ (FCH)} \\ Y=508 \text{ (1FCH)} \rightarrow y=252 \text{ (FCH)} \end{cases}$

DIAGNOSTIC ULTRASOUND APPARATUS

BACKGROUND OF THE INVENTION

1. Field of the Invention

The present invention relates to a diagnostic ultrasound apparatus and, more particularly, relates to a diagnostic ultrasound apparatus in which echo data acquired by radial scanning and represented by a polar coordinate system are converted into echo data represented by a rectangular coordinate system, and then such converted echo data are displayed on a display.

2. Description of the Prior Art

There are known diagnostic ultrasound apparatuses which display tomographic images and the like of a patient based on echo data obtained by transmitting ultrasound waves into the patient and receiving the echo thereof. In the ultrasound apparatus, the transmission and reception of ultrasound waves is carried out with ultrasound probes to perform scanning with ultrasound beams within a scanning plane (i.e., the region from which echo data is obtained). In general, such scanning is performed by mechanical scanning with a transducer or electrical scanning with a transducer array. In recent years, the ultrasound probes of the types which are to be inserted into the blood vessels or body cavities (e.g., the esophagus, digestive tract, urinary tract, vagina, etc.) of patients are widely used.

Furthermore, various ultrasound beam scanning methods have been developed, such as linear scanning, sector scanning, convex scanning, radial scanning and the like. For example, in ultrasound probes of the types which are to be inserted into blood vessels or body cavities, radial scanning is performed to form a circular scanning image. In this case, when such radial scanning is carried out, echo data which have been obtained are identified by a beam number B and a radial direction sampling point number S, respectively, under the polar coordinate system. Thus identified echo data are then temporarily stored in an echo data memory.

However, when an image is actually being displayed on a display, it is necessary to display a circular image identical to that of the scanning plane. For this reason, in order to make the echo data read out from the echo data memory conform with a TV scanning format, a coordinate conversion from the polar coordinate system into the rectangular coordinate system must be carried out at the time such echo data is to be written into a display memory (frame memory).

Hereinafter, the prior art method of processing echo data will be explained with reference to FIG. 1.

Figure 1:
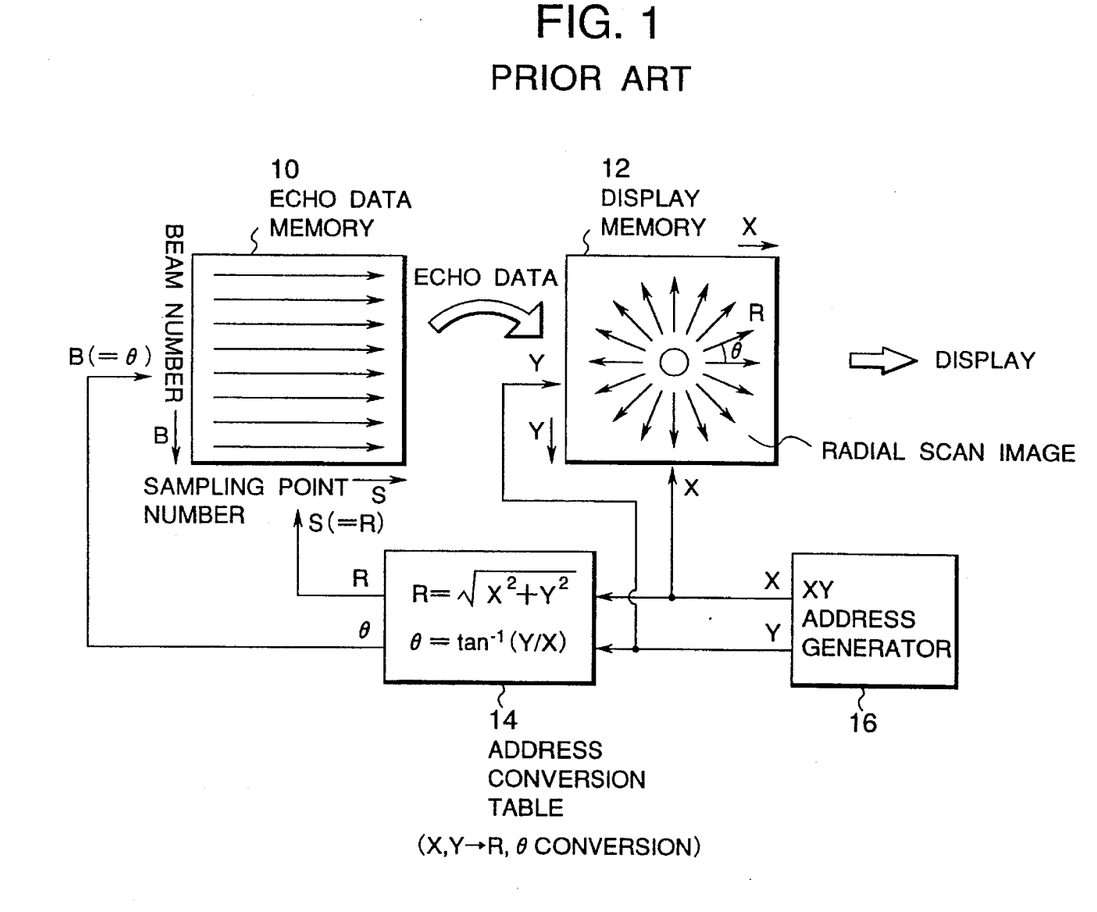
FIG. 1 is a diagram illustrating an address conversion principle of a prior art apparatus.

As shown in FIG. 1, when radial scanning is being carried out, the echo data obtained from the ultrasound probe are temporarily stored in the echo data memory 10 in each ultrasound beam. In this prior art example, each echo data is identified by a beam number B (θ address) and a sampling point number S (R address) thereof, and then thus identified echo data are sequentially stored in the echo data memory 10.

Next, in order to form a display image, the echo data which are read out from the echo data memory 10 undergo a coordinate conversion process from the polar coordinate system into the rectangular coordinate system and thus-converted echo data are written into a display memory 12 (frame memory). As a result, the echo data of each beam is stored in the frame memory 12 in such a way that shows the directions of emissions of such beams. At the time such data are being written into the frame memory 12, an XY address generator 16 generates addresses X, Y sequentially, normally starting from X, Y=0, 0, which are then outputted to the address terminals of the frame memory 12.

In the above arrangement, it is necessary to read out from the echo data memory 10 the echo data which corresponds to the addresses X, Y of the frame memory 12. For this purpose, an address conversion table 14 is provided. Namely, the address conversion table 14 is provided for converting addresses X, Y into addresses R, θ. In the address conversion table 14, a table including calculated results of the following formulas is provided:

$$R=(X^2+Y^2)^{1/2}$$

$$\theta=\tan^{-1}(Y/X)$$

By means of the address conversion table 14, the echo data stored in the echo data memory 10 are read out in accordance with the addresses R, θ which have been converted from the addresses X, Y. In this regard, it should be noted that R corresponds to the address S of the respective beam and θ corresponds to the address B.

Now, after all the echo data have been stored in the frame memory 12, such data are read out therefrom. The read out echo data are D/A converted, and then displayed on a display (not shown in the drawings) in the form of a tomographic image.

Unfortunately, in such prior art diagnostic ultrasound apparatuses, the address conversion table 14 must have all the data between X, Y addresses of the frame memory 12 and the corresponding R, θ addresses of the echo data memory 10. Therefore, it is necessary for the address conversion table 14 to have huge storage capacity.

In more details, in the prior art apparatus, the addresses X, Y of the frame memory 12 are inputted into the address conversion table 14, and the corresponding addresses B, S of the echo data memory 10 are outputted therefrom. Accordingly, in the case where the frame memory 12 has an M×M matrix size and the size of the echo data memory 10 is such that is includes a total beam number L and a total sampling point number N, the conversion table 14 is comprised of M×M words, in which each word being comprised of {log(L×N)/log 2} bits.

For example, in the case where M=512, B=1024 and S=256, the address conversion table 14 is comprised of 512×512 words, in which each word being comprised of 18 bits. In other words, the address conversion table 14 requires a total storage capacity of 512×512×18=4.5M bits, and this is a very huge storage capacity.

Such a huge storage capacity of the address conversion table 14 unavoidably leads to an increased size of the apparatus and higher costs for manufacturing thereof. In particular, in the case of diagnostic ultrasound apparatuses for diagnosing blood vessels, they are required to have a reduced size, since they are used in a relatively narrow space such as an operation room. Alternatively, in the case where such address conversion is carried out using an arithmetic circuit instead of such an address conversion table, the address conversion rate becomes slow, thus making it difficult to perform rapid operations with the diagnostic ultrasound apparatus. In this case, it should be understood that since the ultrasound apparatuses for diagnosing blood vessels are required to have high frame rate due to rapid movements of a blood vessel to be diagnosed, they are required to have more rapid data processing speed for processing echo data obtained from reflected ultrasound waves.

SUMMARY OF THE INVENTION

Taking into account the above-mentioned problems of the prior art, it is therefore an object of the present invention to provide a diagnostic ultrasound apparatus that can perform address conversion with an address conversion table having a greatly reduced required storage capacity.

In order to achieve the above object, the diagnostic ultrasound apparatus according to the present invention comprises: an ultrasound probe for transmitting and receiving ultrasound waves to and from a patient to obtain echo data of the patient; a first memory in which the echo data are to be written by being identified with addresses represented by a polar coordinate system; a second memory in which the echo data read out from the first memory are to be written according to first addresses represented by a rectangular coordinate system; an address generator for sequentially generating the first rectangular coordinate addresses, the first rectangular coordinate addresses being used when the echo data are written into the second memory; and address converting section for converting the first rectangular coordinate addresses generated by the address generating means into the polar coordinate addresses, the address conversion being carried out based upon addresses of a representative quadrant which is one of a plurality of quadrants of a second rectangular coordinate system which is obtained by converting the first rectangular coordinate system so as to correspond to the polar coordinate system, in which the plurality of quadrants of the second rectangular coordinate system correspond to those of the polar coordinate system, and quadrant discriminating information which discriminates which of the plurality of quadrants the representative quadrant belongs to; whereby the echo data are read out from the first memory in accordance with the converted polar coordinate addresses which are supplied from the address converting section, and thus read out echo data are written into the second memory.

The above described invention has been made on the basis of the following unique findings.

Namely, when linear scanning, sector scanning or radial scanning is performed, a scanning plane produced by such scanning has line symmetry relationship with respect to a center beam line. In particular, in the radial scanning, the produced scanning plane is formed into a circular shape. Therefore, when thus produced circular scanning plane is divided four regions (quadrants I, II, III, IV), the adjacent regions (quadrants) have line symmetry relationship with each other. This means that in the case of radial scanning, addresses of one of the quadrants are stored in a conversion table, it becomes possible to obtain the contents of other addresses of the other quadrants based upon the conversion table.

In the present invention, by utilizing such a line symmetry relationship of the scanning plane, storage capacity of an address conversion table is greatly reduced.

Namely, according to the present invention described above, when echo data read out from the echo data memory (first memory) are written into the frame memory (second memory), the address generator generates the first rectangular coordinate addresses X, Y sequentially. The generated addresses X, Y are also inputted into a quadrant discriminating means in the address converting section, in which quadrants are discriminated on the basis of the addresses X, Y.

On the other hand, the first rectangular coordinate addresses X, Y generated by the address generator are converted into the second rectangular coordinate addresses x, y of the representative quadrant. In this case, addresses X, Y of the other quadrants are obtained based upon the addresses x, y of the representative quadrant and the quadrant discriminating information extracted from the addresses X, Y. The second rectangular coordinate addresses x, y are then converted into corresponding polar coordinate addresses R, θ. The polar coordinate addresses R, θ are then converted into the addresses S, B, so that the echo data are read out from the echo data memory in accordance with the converted polar coordinate addresses S, B, and thus read out echo data are written into the frame memory.

Therefore, it is sufficient for the address conversion table of the address converting section to store only the data concerning the relationship between the rectangular coordinate addresses X, Y and polar coordinate addresses R, θ of the representative quadrant which can represent all the quadrants. As a result, according to the present invention, it is possible to reduce the storage capacity of the address conversion table into one fourth of that of the prior art apparatus.

As was explained previously above, the present invention makes it possible to reduce the required storage capacity of the address conversion table, and this in turn makes it possible to improve the speed at which address conversion can be carried out.

In the present invention, it is preferred that each of the first and second memory means includes a pair of memories so as to be able to perform a write operation and a readout operation alternately in each scanning plane or in each frame. This enables to process the echo data continuously.

Further, it is preferred that the address converting section is comprised of: a prepositioned converting section for converting the first rectangular coordinate addresses X, Y into the second rectangular coordinate addresses x, y of the representative quadrant, in which an origin of the second rectangular coordinate system is coincide with the origin of the polar coordinate system; an address conversion table for converting the second rectangular coordinate addresses of the representative quadrant into polar coordinate addresses of the corresponding quadrant thereof; and a postpositioned converting section for converting the converted polar coordinate address of the representative quadrant into the polar coordinate addresses.

In this case, it is also preferred that the polar coordinate addresses are represented by R, θ, in which the second rectangular coordinate addresses of the representative quadrant corresponds to the polar coordinate addresses of the range $0° \leq θ < 90°$.

Further, in the present invention, the address conversion table can be formed from a ROM or a RAM. In the latter case, it is possible to change the contents of the address conversion table freely.

Further, the present invention is particularly advantageous when it is applied to an ultrasound probe in which radial scanning is performed. Examples of such ultrasound probes include an ultrasound catheter to be inserted into blood vessels.

Other objects, structures and functions of the present invention will become apparent when the following descriptions of the preferred embodiment are taken in conjunction with the accompanying drawings.

DETAILED DESCRIPTION OF THE PREFERRED EMBODIMENTS

A detailed description of the preferred embodiments according to the present invention will now be described below with reference to the appended drawings.

(A) Overall Construction of the Apparatus

Figure 2:
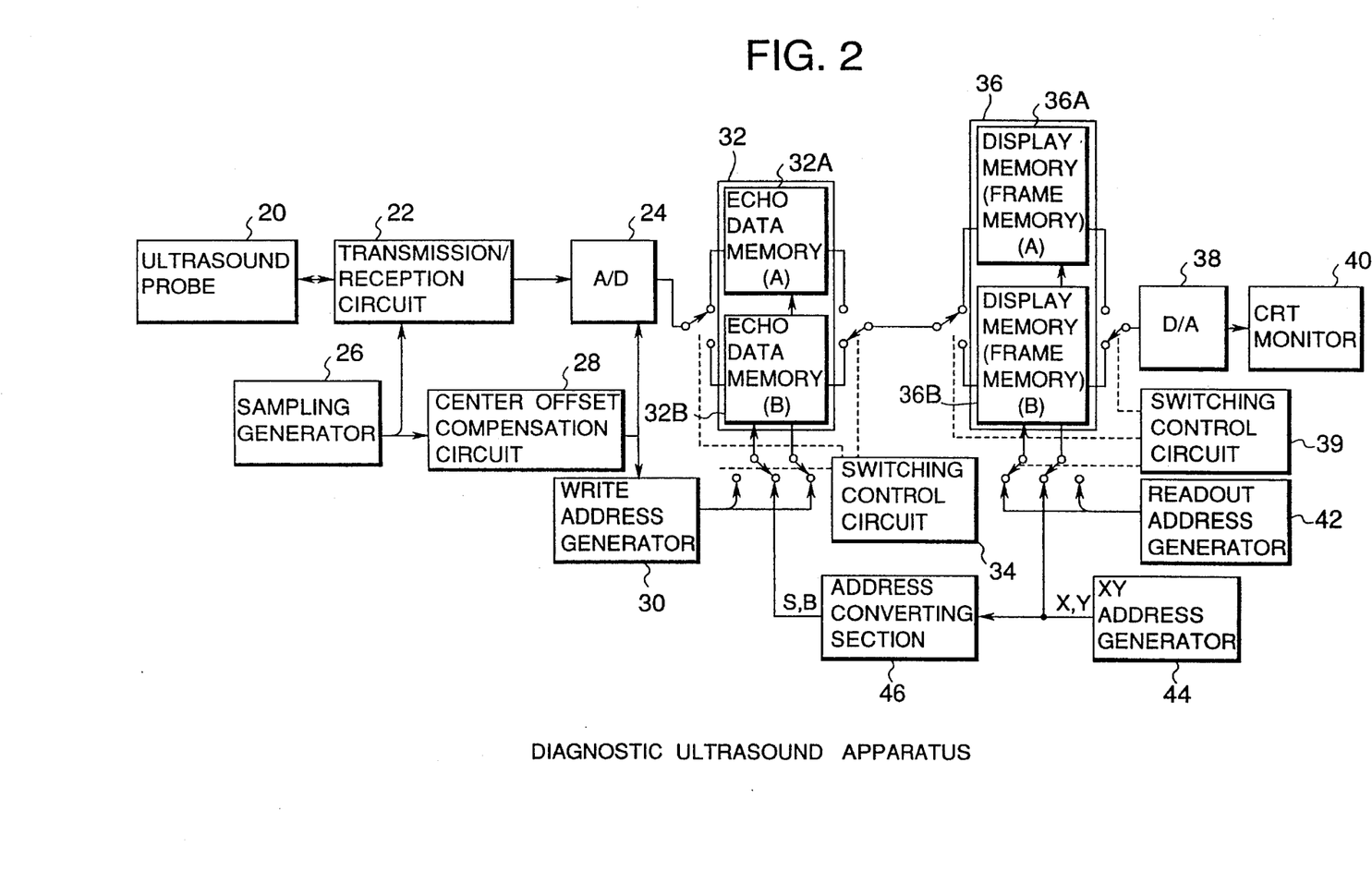
FIG. 2 is a block diagram showing the overall construction of a diagnostic ultrasound apparatus according to the present invention.

FIG. 2 is an illustration showing the overall construction of one embodiment of a diagnostic ultrasound apparatus according to the present invention. In this embodiment, an ultrasound probe 20 which is constructed as an ultrasound catheter that is adapted to be inserted into a body cavity or blood vessels is used. In such an ultrasound probe 20, a transducer element is provided at the tip portion of a catheter which is adapted to be inserted into blood vessels and the like. The transducer element is capable of being rotated around its axis inside the catheter to perform transmission and reception of ultrasound waves, thereby making it possible to carry out the above described radial scanning.

The ultrasound waves received by the ultrasound probe 20 are converted into electrical echo signals. Thereafter, the electrical signals are sent to an A/D converter 24 via a transmission/reception circuit 22, and then converted into digital signals, that is echo data.

Further, a sampling timing generator 26 sends a timing signal directly to the transmission/reception circuit 22. At the same time, the timing signal is also sent to the A/D converter 24 and a write address generator 30 via a center offset compensation circuit 28.

A pair of echo data memory 32 is provided to temporarily store the obtained echo data. In this embodiment, the echo data memory 32 is composed of a pair of memories 32A, 32B. The reason why these two memories 32A, 32B are provided in this embodiment is to make it possible to alternately carry out write and readout operations. Namely, the write and readout operations for the echo memory 32 are carried out in each scanning plane. Therefore, by providing the two memories 32A, 32B, one memory can be used to perform a write operation while the other memory performs a readout operation, and this makes it possible to perform a continuous data conversion process.

The write operation of the echo data is carried out in accordance with the address generated by the write address generator 30, in which each echo data is represented by a beam number B and a sampling point number S, and such data is written in the echo data memory 32 Further, a switching control circuit 34 is provided for the purpose of carrying out control of the switching operations of change-over switches around the echo data memories 32A, 32B.

Each echo data read out from either echo data memory 32A or 32B is written into a display memory 36. The display memory 36 acts as a so-called frame memory. In the frame memory 36, the echo data having been stored in the echo data memory 32 under the physical address condition are rearranged and then stored in an ordered display format and the rectangular coordinate system. The frame memory 36 is also composed of a pair of memories 36A, 36B. The reason why these two memories 36A, 36B are provided is the same as that of the echo data memories 32A, and 32B. Namely, in the same manner as was explained above, the write and readout operations for the frame memory 36 are carried out in each frame. Therefore, by providing these two memories 36A, 36B, one memory can be used to perform a write operation while the other memory performs a readout operation.

The echo data which are read out from either the frame memory 36A or 36B are converted into analog signals by a D/A converter and then these analog signals are sent as TV signals to a CRT monitor. In this way, a tomographic image of the blood vessel around the catheter is displayed in the form of the radial scanning image. In this embodiment, a switching control circuit 39 is provided for the purpose of carrying out control of the switching operations of change-over switches around the frame memories 36A, 36B.

A readout address generator 42 is provided for generating addresses in order to read out the echo data from either of the frame memories 36A, 36B.

An XY address generator 44 is provided for generating addresses X, Y which are used to write the echo data from one of the echo data memories 32A, 32B into one of the frame memories 36A, 36B. In this case, addresses started from X= 0, Y=0 are sequentially generated. In addition to be supplied to one of the frame memories 36A, 36B as described above, the addresses X, Y are sent to an address converting section 46.

The address converting section 46, as will be described in detail later, converts the addresses X, Y into addresses S, B, and in this way carries out address conversion. In this regard, it should be noted that in this embodiment, the line symmetry relationship between the adjacent quadrants in the radial scanning plane is utilized to reduce the contents of an address conversion table 52 of the address converting section 46.

(B) Address Conversion Principle

Figure 3:
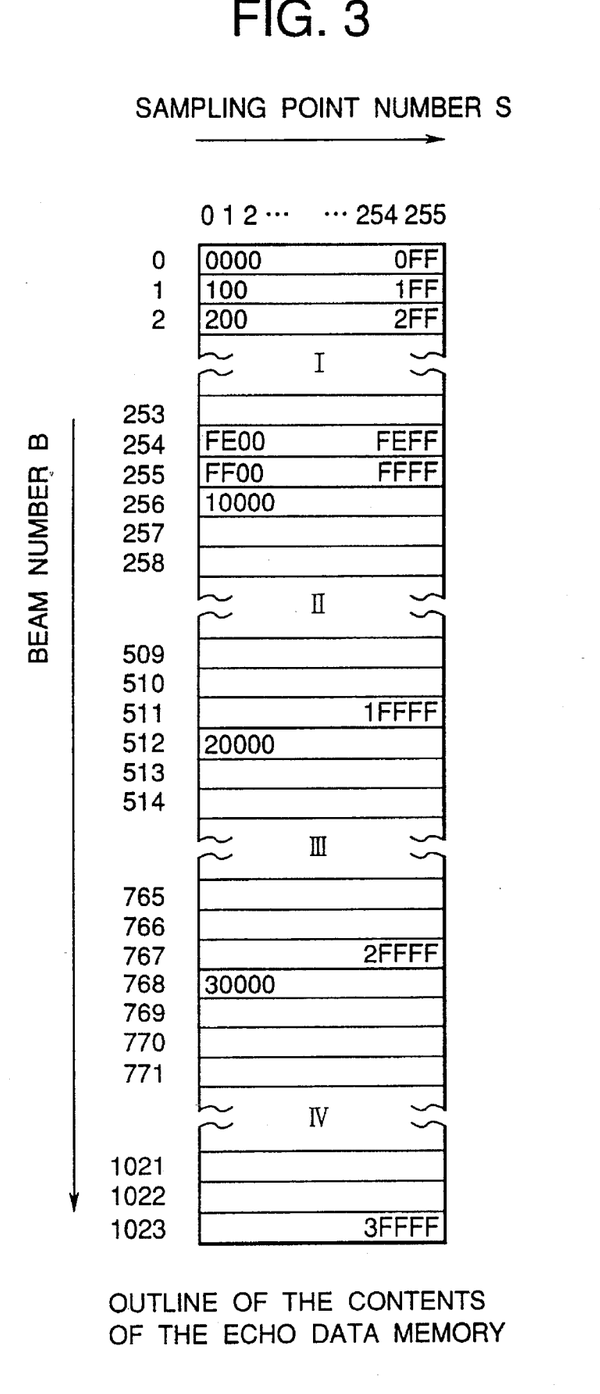
FIG. 3 is an outline of the contents of an echo data memory.

FIG. 3 is an outline of the contents of the echo data memory 32. The echo data obtained by radial scanning are stored in the echo data memory 32 in each beam under the polar coordinate system. Namely, each echo data is identified by a beam number B (0–1023) and a sampling point number S (0– 255), and such B and S constitute a memory address. In this case, the address B is comprises of 10 bits ($B_0$–$B_9$) and the address S is comprised of 8 bits ($S_0$–$S_4$). Further, the beam number B corresponds to the θ coordinate and the sampling point number S corresponds to the R coordinate.

Figure 4:
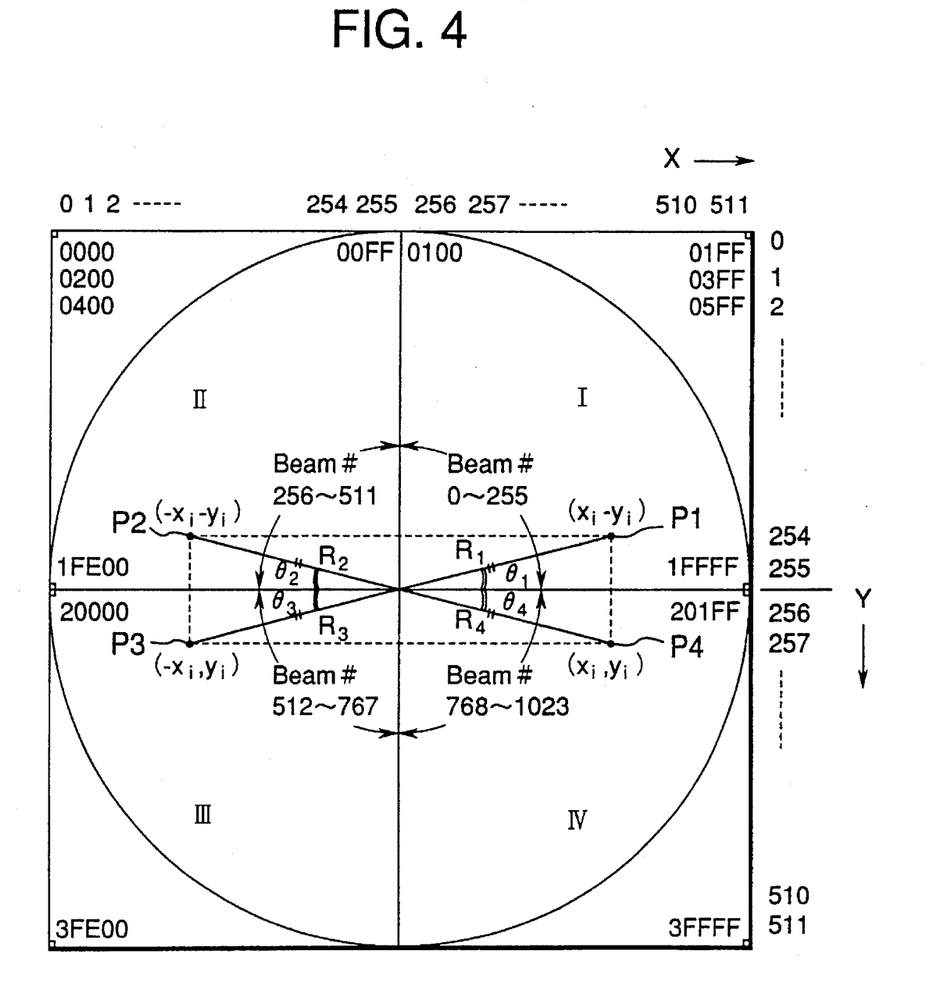
FIG. 4 is a diagram illustrating the relationship between X, Y coordinates and R, θ coordinates.

FIG. 4 is an illustration showing the relationship between the addresses X, Y in the frame memory 36 and the addresses R, θ of the echo data. As shown in FIG. 4, for the addresses X, Y of the frame memory 36 under the rectangular coordinate system, the upper left hand corner is defined as "$000_{(HEX)}$" and the lower right hand corner is defined as "$3FFF_{(HEX)}$". On the other hand, as shown in FIG. 4, in the polar coordinates corresponding to the scanning plane from which echo data are collected, the echo data are represented by θ corresponding to the beam number and R corresponding to the distance in the radial direction thereof.

Also, as is clear from FIG. 4, an echo data position P1 has line symmetry with respect to positions P2 and P4 under the polar coordinate system. Further, a position P3 has point symmetry with respect to P1 and line symmetry with respect to P2 and P4. Namely, the adjacent regions (quadrants) have line symmetry with respect to each other.

From such line symmetries, it can be concluded that $R_1=R_2=R_3=R_4$ and $674_1=\theta_2=\theta_3=\theta_4$.

Now, if the origin of the rectangular coordinate system (X-Y coordinates) would be overlapped with the origin O of the polar coordinate system and thus overlapped coordinates are viewed from the origin O, the following relationship can be obtained. Namely, if the coordinates of P4 are defined as $(x_1, y_1)$, then the coordinates of P1 are $(x_1, -y_1)$, the coordinates of P2 are $(-x_1, -y_1)$, and the coordinates of P3 are $(-x_1, y_1)$. This relationship means that the absolute value of x and y become the same value, respectively.

Consequently, if the display image is divided into four quadrants I, II, III, IV, and the relationship between x, y and R, θ in any one of the quadrants is stored in the table, address conversion for all the addresses x, y can be effectively carried out.

In other words, by providing a table in which conversion formulas between the addresses x, y represented by the rectangular coordinate system (a second rectangular coordinate system) and the addresses R, θ represented by the polar coordinate system for a representative quadrant among the four quadrants is stored, it becomes possible to process the address conversion for all of the quadrants.

In the present embodiment, quadrant IV in FIG. 4 is designated as the representative quadrant, since the sign of the addresses x, y in the IV quadrant are coincide with the sign of the addresses X, Y of the rectangular coordinate system. Therefore, by storing the data corresponding to the relationship between the addresses x, y and the addresses R, θ in the quadrant that is the representative quadrant into the conversion table 52 of the address converting section 46, it becomes possible to convert the addresses x, y of all the quadrants into the addresses R, θ.

Figure 5:
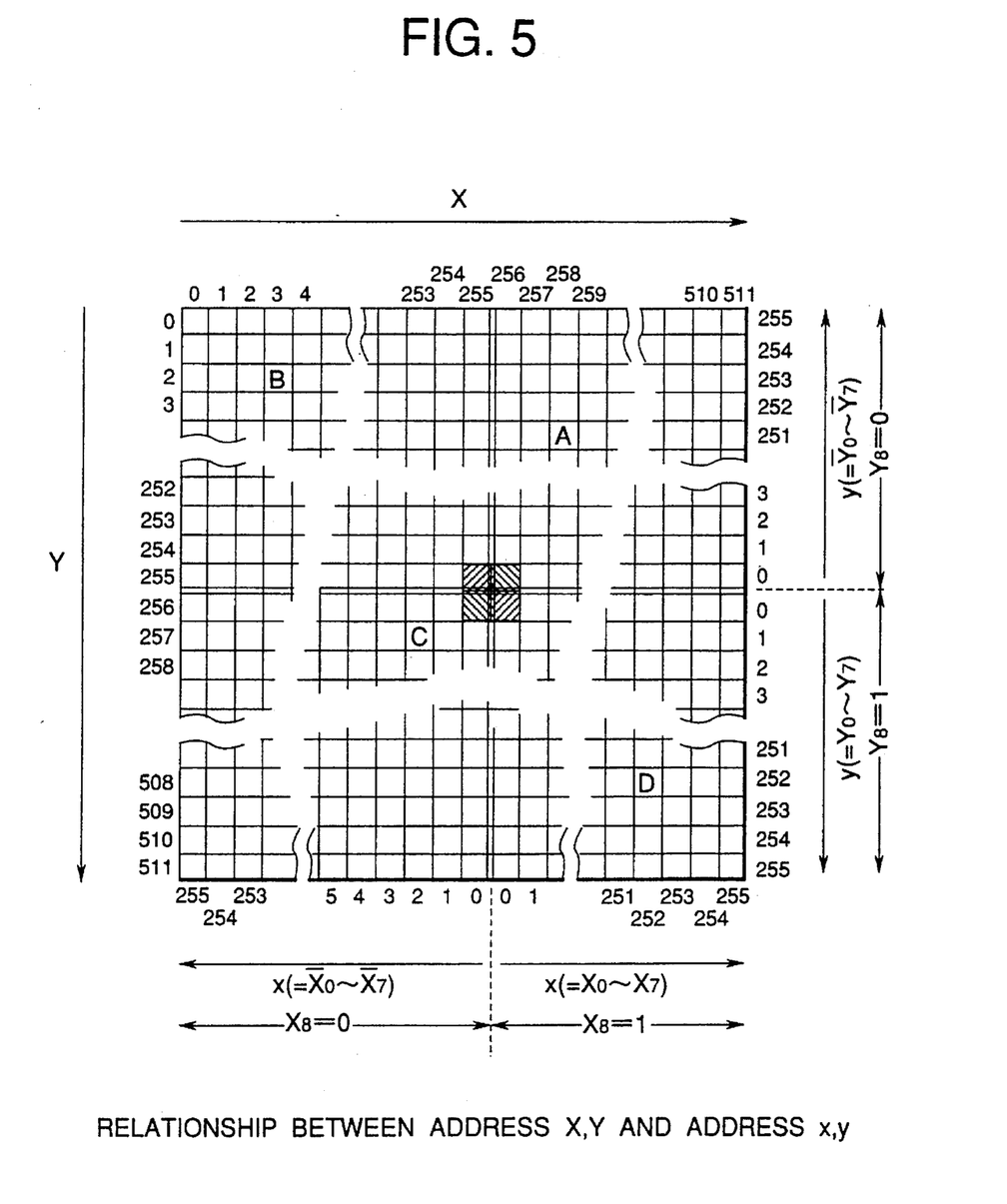
FIG. 5 is a diagram illustrating the relationship between addresses X, Y and addresses x, y.

FIG. 5 shows the relationship between the X,Y address and the x,y address. In this case, the address X is comprised of 9 bits ($X_0$-$X_8$) and the address Y is also comprised of 9 bits ($Y_0$-$Y_8$). Accordingly, when the address X lies between 0–255, $X_8$ is "0" and when the address X lies between 256–511, $X_8$ is "1". In the same manner as described for the X address, when the address Y lies between 0–255, $Y_8$ "0" and when the address Y lies between 256–511, $Y_8$ is "1". Therefore, by determining the sign of $X_8$ and $Y_8$, namely the "0" and "1" values of $X_8$ and $Y_8$, it is possible to easily discriminate which quadrant the echo data belongs in.

Namely, in the present embodiment, it is possible to discriminate which quadrant the addresses X, Y belong in on the basis of the combinations of the sign of the uppermost bit of the X,Y address. Based upon the discrimination, sign of the addresses $X_0$-$X_7$ and addresses $Y_0$-$Y_7$ are appropriately inversed, and by doing so the X, Y address is appropriately converted into the x, y address. In more details, when $X_8$ is "0", the sign of $X_0$-$X_7$ are inversed, and when $X_8$ is "0", the sign of $X_0$-$X_7$ are not inversed. In the same manner, when $Y_8$ is "0", the sign of $Y_0$-$Y_7$ are inversed, and when $Y_8$ is "0", the sign of $Y_0$-$Y_7$ are not inversed. In other words, since the origin O of the x, y address is positioned at the center of the scanning plane of the radial scanning, the sign of $X_0$-$X_7$ remains the same while the sign of $Y_0$-$Y_7$ must be inversed. In like manner, for quadrant II the sign of both X and Y must be inversed, while for quadrant III only the sign of X needs to be inversed. However, in quadrant IV, it is not necessary to inverse the sign of X, Y, since the directions of the addresses X, Y are common with those of the addresses x, y.

As described above, by converting the X, Y address of the rectangular coordinate system into the x, y address of the representative quadrant, the origin of the x-y coordinates is positioned at the center of the scanning plane of the radial scanning, so that it is coincide with the origin O of the polar coordinate system. As a result, it becomes possible to convert the addresses x, y on the representative quadrant into the addresses R, θ which are represented by the polar coordinate system.

Figure 6:
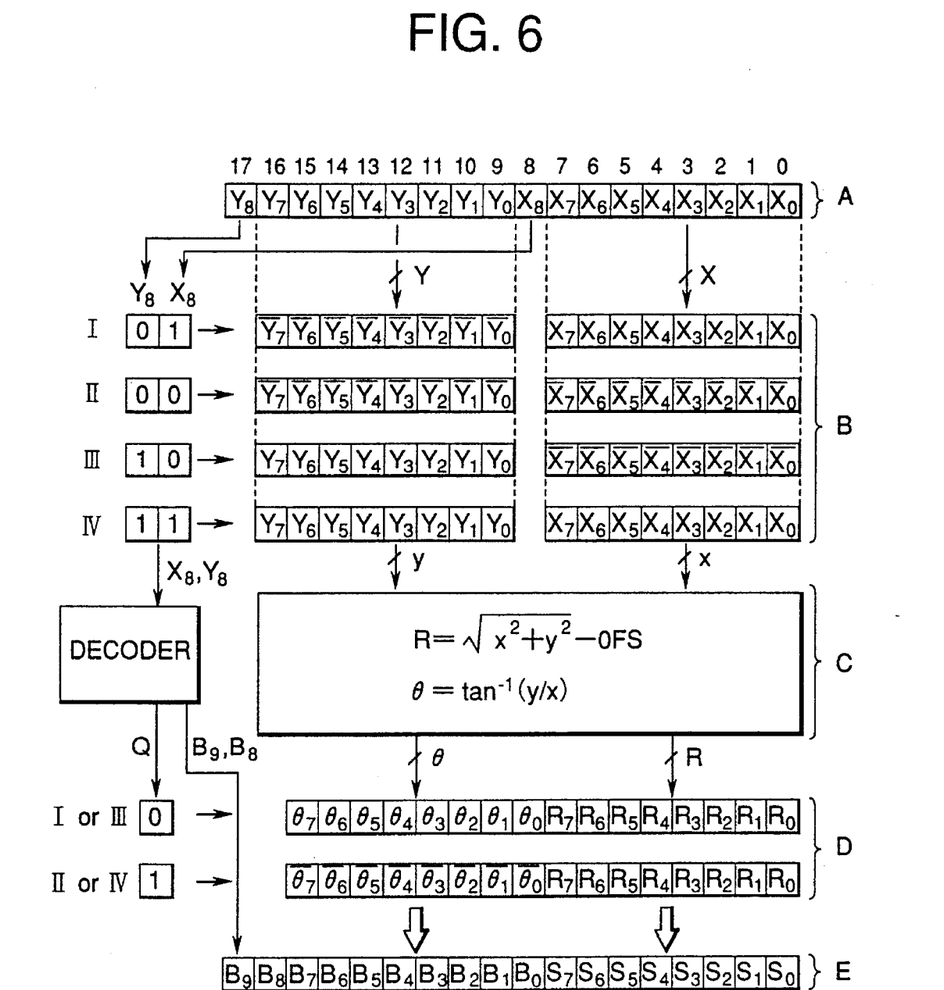
FIG. 6 is a diagram in a flow chart form showing the process steps for address conversion.

FIG. 6 is an illustration in a flow chart form showing the process steps for the address conversion. In step (A), addresses X, Y are generated by the XY address generator 44 shown in FIG. 2. At this point, $X_8$ and $Y_8$ are inputted into both a prepositioned converter 54 and a decoder 50 as quadrant information, and processed in a different route from $X_0$-$X_7$ and $Y_0$-$Y_7$.

Next, at step (B), the above-described sign inversion is carried out for $X_0$-$X_7$ and $Y_0$-$Y_7$ based upon the quadrant information obtained from $X_8$ and $Y_8$. Namely, the sign inversion process of FIG. 5 is carried out.

Next, at step (C), the addresses x, y generated in the step (B) are converted from the rectangular coordinates into polar coordinates to produce the addresses R, θ.

Figure 8:
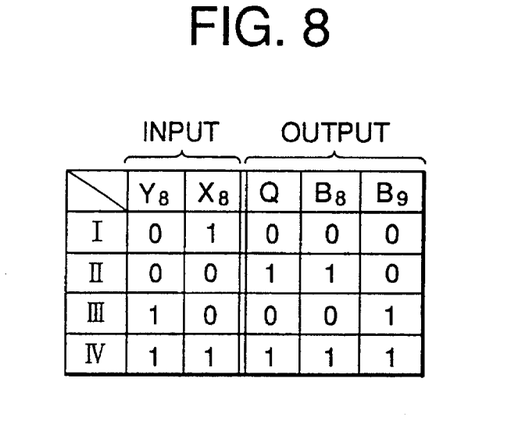
FIG. 8 is a block diagram showing the relationship between the inputs and outputs of a decoder 50.

On the other hand, $X_8$ and $Y_8$ are inputted into the decoder 50 which is provided as a quadrant discriminating means, and the decode 50 then outputs Q and $B_8$ and $B_9$ as quadrant discriminating information. The relationship between the input and the output is shown in FIG. 8.

In this case, Q is indicated by "0" when the echo data lies in quadrants I and III, and indicated by "1" when the echo data lies in the quadrants II and IV. This means a flag which shows bit inversion has been carried out for θ. Therefore, in the step (D), the bit inversion is carried out for the data corresponding to $\theta_0$-$\theta_7$, only when the corresponding echo data lie in the quadrants II and IV. This bit inversion must be carried out because θ is determined with respect to the X axis and therefore the order of readout of the echo data of the quadrants II and IV are reversed to that of the quadrants I and III.

Further, $B_8$ and $B_9$ correspond to the uppermost two bits of the beam address on the echo data memory 32, and they are outputted in order to compensate the beam address of the echo data memory 32. By this compensation, it becomes possible to determine which of the four quadrants I–IV the beam lies in. In more details, when $B_8$="0" and $B_9$="0", the echo data lies in the quadrant I. Further, when $B_8$="0" and $B_9$="1", the echo data lies in the quadrant II, and when $B_8$="1" and $B_9$="0", the echo data lies in the quadrant III, and when $B_8$="0" and $B_9$="1", the echo data lies in the quadrant IV.

Accordingly, in the steps (E), on the basis of the data obtained in the step (D) and $B_8$, $B_9$ outputted from the decoder 50, the address S ($S_0$-$S_7$) and the address B ($B_0$-$B_9$) can be obtained.

In this regard, it should be noted that it is sufficient for the address conversion table 52 used in the step (C) to have coordinate conversion data for one representative quadrant. As a result, the volume of the data to be stored in the address conversion table 52 can be reduced into approximate one fourth of the volume of the data in the prior art apparatus.

(C) Address Converting Section

Figure 7:
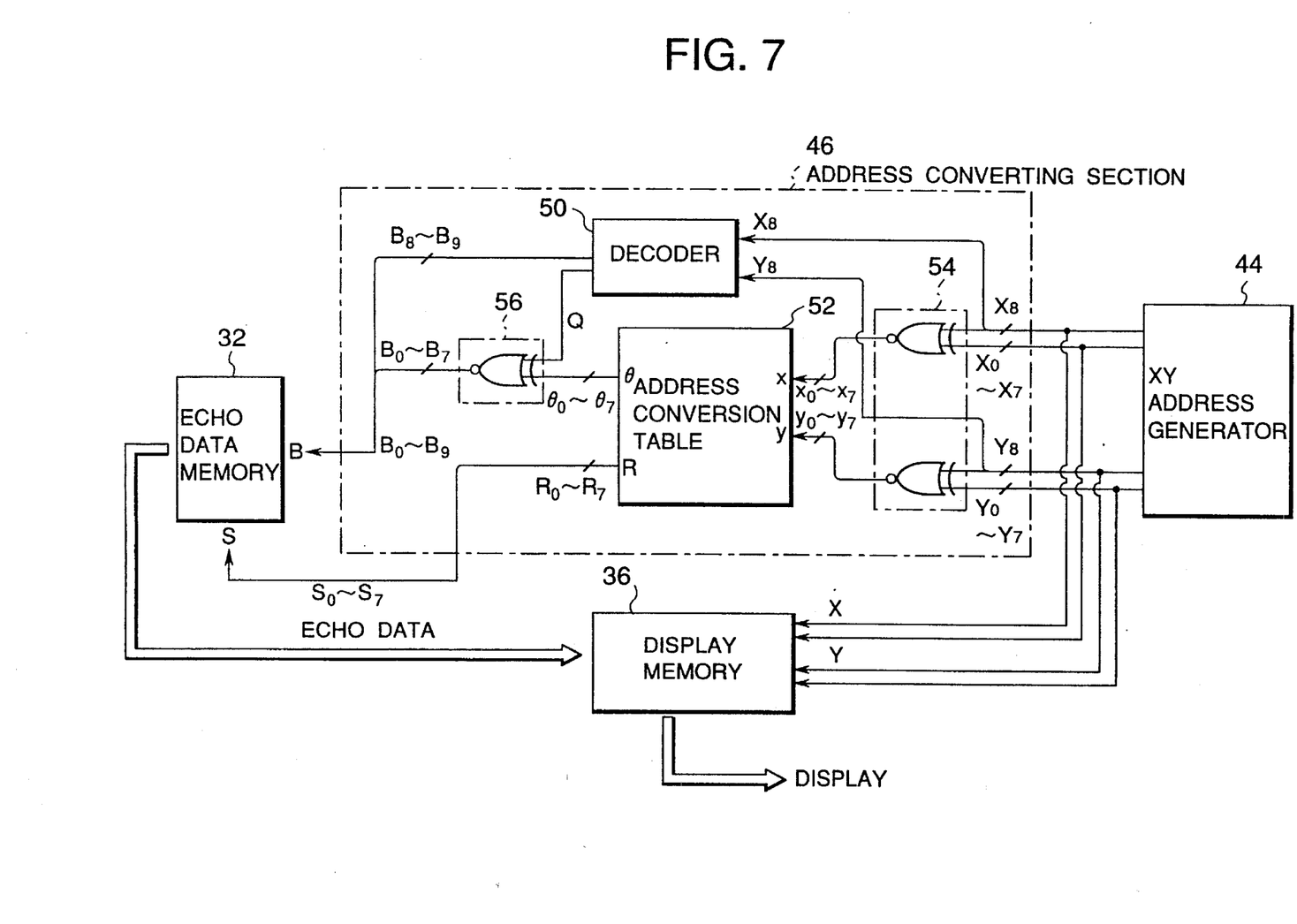
FIG. 7 is a block diagram showing a construction of an address converting section 46.

FIG. 7 shows a specific example of a construction of the address converting section 46.

The XY address generator 44 outputs addresses X, Y. The addresses X, Y are then inputted into a prepositioned converting section 54. The prepositioned converting section 54 is comprised of two exclusive OR circuits, in which in the case where $X_8$ is "1", it outputs $X_0$–$X_7$ as addresses $x_0$–$x_7$ for the representative quadrant. On the other hand, in the case where $X_8$ is "0", the prepositioned converting section 54 inverses each bit of $X_0$–$X_7$ and then outputs the inversed data as $x_0$–$x_7$. This is done in the same manner as Y. Namely, when $Y_8$ is "1", $Y_0$–$Y_7$ are outputted without change, but when $Y_8$ is "0", the bits of $Y_0$–$Y_7$ are reversed and then $y_0$–$y_7$ are outputted. In this case, the operations of the prepositioned converting section 54 correspond to the step (B) of FIG. 6.

In the address converting section 46, the addresses $X_8$ and $Y_8$ in the addresses X, Y outputted from the XY address generator 44 are not only inputted into the prepositioned converting section 54 but also separately inputted into the decoder 50 which acts as a quadrant determining means. The decoder 50 outputs Q, $B_8$, $B_9$ in accordance with the contents of $X_8$ and $Y_8$ as shown in FIG. 8, which makes it possible to obtain quadrant discriminating information. Then, in accordance with the contents of $X_8$ and $Y_8$, the decoder 50 outputs the data shown in FIG. 8.

The address conversion table 52 is a table for converting addresses under the rectangular coordinate system into addresses under the polar coordinate system, and more concretely stated enables to convert the addresses x ($x_0$–$x_7$), y ($y_0$–$y_7$) in the representative quadrant into the addresses R ($R_0$–$R_7$), θ ($θ_0$–$θ_7$). This operation corresponds to the step (C) in FIG. 6.

In this way, $θ_0$–$θ_7$ and $R_0$–$R_7$ are outputted from the address conversion table 52. In this case, because it is necessary to carry out a bit inversion in quadrant II and quadrant IV for the address θ, an exclusive OR is obtained in a postpositioned converting section 56 for a predetermined signal Q outputted from the decoder 50. This operation corresponds to the step (D) in FIG. 6.

Then, in order to carry out the step (E) of FIG. 6, $B_8$ and $B_9$ outputted from the decoder 50 are added to $θ_0$–$θ_7$ to form address data $B_0$–$B_9$ which are to be inputted into the echo data memory 32. On the other hand, during the step (E) $R_0$–$R_7$ which are outputted from the address conversion table 52 are also inputted as the address data $S_0$–$S_7$ into the echo data memory 32.

In this way, the echo data identified by the addresses B, S are read out from the echo data memory 32, and then stored in the corresponding addresses specified by X, Y on the frame memory 36.

Figure 9:
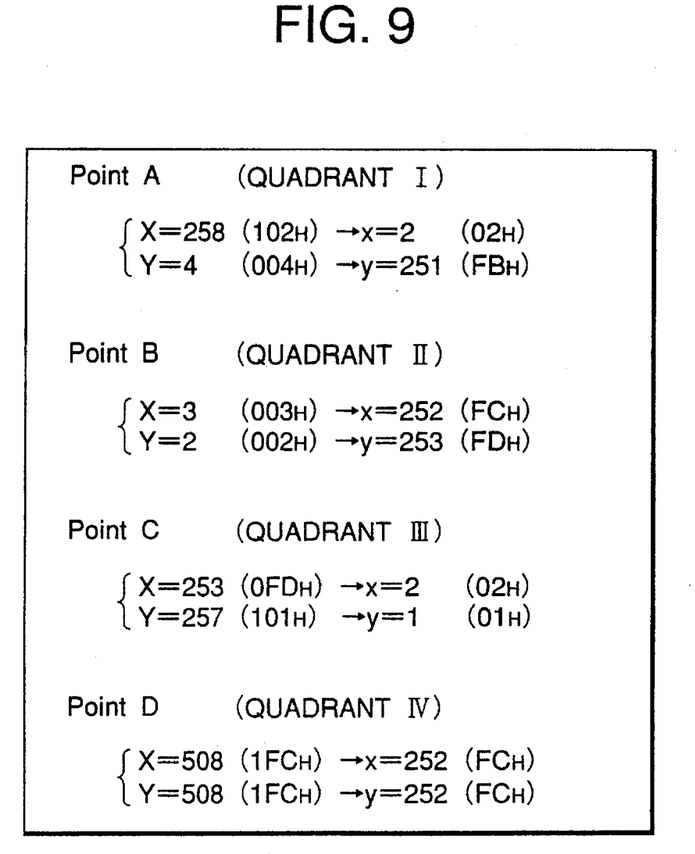
FIG. 9 is a diagram showing the relationship between the addresses X, Y of points A–D shown in FIG. 5 and the addresses x, y.

Finally, after such address conversion has been carried out for all the combinations of X and Y, echo data corresponding to a radial scanning image are established in the frame memory 36, which are then read out and displayed on a CRT monitor 40 after a D/A conversion is performed through the D/A converter 38. In this connection, FIG. 9 shows an example relationship between the addresses X, Y of points A– D shown in FIG. 5 and the addresses x, y in the representative quadrant.

According to the embodiment described above, since an echo data memory address is being generated by performing address conversion from the rectangular coordinate system into the polar coordinate system for only one quadrant, it is possible to reduce the matrix of the frame memory to be referenced at the address conversion to 256×256 that is ¼ the size of the prior art matrices.

Furthermore, because the upper two bits ($B_8$, $B_9$) of the beam address of the echo data memory are outputted by the decoder 50 which acts as the quadrant determining means, it is not necessary for the address conversion table 52 to process the data corresponding to these two bits.

Accordingly, the 512×512×(10+8)=4.5M bit storage capacity required for the conversion tables of the prior art apparatus can be reduced by the present invention to a storage capacity of 256×256×(8+8)=1M bit. In other words, the conversion table of the present invention requires a storage capacity that is about ¹⁄₄.₅ the size of the storage capacity of the prior art conversion tables.

(D) Example Application

It is possible to change the contents of the address conversion table 52 so as to suit different scanning operations. For example, when radial scanning is being carried out with a diagnostic ultrasound apparatus, conversion is performed as described above. On the other hand, when linear scanning is being carried out, the contents of the address conversion table 52 are changed for linear scanning use. In this case, echo data in the echo data memory 32 are read out in accordance with the changed contents of the address conversion table 52 and such read out echo data are fed to the frame memory 36.

Furthermore, it is also possible to apply the present invention to other types of scanning, such as sector scanning and convex scanning. In these scanning methods, the scanning plane has line symmetry relationship with respect to the center beam line. Therefore, if an address conversion table for addresses of one region divided by this center beam line is prepared, addresses of the other region can be obtained on the basis of the addresses of said one region. Therefore, in the same way as the above embodiment, it is possible to reduce the storage capacity of the conversion table.

Moreover, the contents of the address conversion table can be freely rewritten in order to deal with such factors as differences in center offset, enlargement ratios, etc.

Furthermore, even though thee was a 1 to 1 correspondence between the addresses of the display memory and those of the echo data memory for the embodiment described above, it is possible to freely change such correspondence. For example, it is possible to establish a 1 to 4 correspondence. In that case, echo data are transmitted to the frame memory while carrying out two dimensional linear interpolation. Moreover, when it is necessary to rewrite the contents of the address conversion table, a RAM can be used instead of a ROM. In that case, the contents thereof can be freely changed. Furthermore, although the display image was divided into four quadrants for the embodiment described above, it is also possible to divide the image into two regions for instance, if there exists line symmetry relationship between the two regions. Furthermore, if this invention is applied to an apparatus in which a radial scanning is performed, it is possible to divide a display image into eight regions in which adjacent regions have line symmetry relationship.

In the embodiment described above, the postpositioned converting section 56 is comprised only of an exclusive OR circuit. However, by providing an add-on summing circuit which adds any value to the polar coordinate address θ and the quadrant determining bits $B_8$, $B_9$ and which outputs this as echo data memory address $B_0$–$B_9$, it is possible to display an ultrasound image under the condition that the image is rotated through a predetermined angle.

Furthermore, by providing either a multiplying circuit or a shift circuit for outputting echo data memory address $S_0$–$S_7$ after respectively multiplying the random values in the polar coordinate address R or shifting the random bits, it is possible to easily display an enlarged or shrunken ultrasound image.

As was explained previously above, the present invention makes it possible to reduce the required storage capacity of the address conversion table, and this in turn makes it possible to improve the speed at which conversion can be carried out.

Finally, it should be understood that many changes and additions may be made to the preferred embodiment described above without departing from the scope of the invention as defined by the appended claims.

What is claimed is:

1. A diagnostic ultrasound apparatus, comprising:

an ultrasound probe for transmitting and receiving ultrasound waves to and from a patient to obtain echo data of the patient;

a first memory means in which said echo data are to be written by being identified with addresses represented by a polar coordinate system;

a second memory means in which said echo data read out from said first memory means are to be written according to first addresses represented by a rectangular coordinate system;

means for sequentially generating said first rectangular coordinate addresses, said first rectangular coordinate addresses being used when said echo data are written into said second memory means; and address converting means for converting said first rectangular coordinate addresses generated by said address generating means into said polar coordinate addresses, said address conversion being carried out based upon addresses of a representative quadrant which is one of a plurality of quadrants of a second rectangular coordinate system which is obtained by converting said first rectangular coordinate system so as to correspond to said polar coordinate system, in which said plurality of quadrants of said second rectangular coordinate system correspond to a plurality of quadrant of said polar coordinate system, and quadrant discriminating information which discriminates which of said plurality of quadrants said representative quadrant belongs to;

whereby said echo data are read out from said first memory means in accordance with said converted polar coordinate addresses which are supplied from said address converting means, and thus read out echo data are written into said second memory means.

2. The diagnostic ultrasound apparatus as claimed in claim 1, wherein said first memory means includes at least a pair of memories so as to be able to perform a write operation and a readout operation alternately in each scanning plane.

3. The diagnostic ultrasound apparatus as claimed in claim 1, wherein said second memory means includes at least a pair of memories so as to be able to perform a write operation and a readout operation alternately in each frame.

4. The diagnostic ultrasound apparatus as claim in claim 1, wherein said address converting means includes a quadrant discriminating means for discriminating which of said plurality of quadrants said representative quadrant belongs to on the basis of said first rectangular coordinate addresses generated by said address generating means and then for outputting quadrant discrimination information.

5. The diagnostic ultrasound apparatus as claimed in claim 4, wherein said address converting means further includes:

a prepositioned converting section for converting said first rectangular coordinate addresses into said second rectangular coordinate addresses of said representative quadrant, in which an origin of said second rectangular coordinate system is coincide with an origin of said polar coordinate system;

an address conversion table for converting said second rectangular coordinate addresses of said representative quadrant into polar coordinate addresses of the corresponding quadrant thereof; and a postpositioned converting section for converting said converted polar coordinate addresses of said representative quadrant into said polar coordinate addresses.

6. The diagnostic ultrasound apparatus as claimed in claim 5, wherein said polar coordinate addresses are represented by R, θ, in which said second rectangular coordinate addresses of the representative quadrant corresponds to the polar coordinate addresses of the range $0° \leq θ < 90°$.

7. The diagnostic ultrasound apparatus as claimed in claim 5, wherein said address conversion table comprises a ROM.

8. The diagnostic ultrasound apparatus as claimed in claim 5, wherein said address conversion table comprises a RAM so as to be able to change the contents thereof freely.

9. The diagnostic ultrasound apparatus as claimed in claim 1, wherein said ultrasound probe is constituted into a radial scanning use.

10. The diagnostic ultrasound apparatus as claimed in claim 9, wherein said ultrasound probe is constituted into a catheter type to be inserted into blood vessels.

11. A diagnostic ultrasound apparatus, comprising:

an ultrasound probe for transmitting and receiving ultrasound waves to and from a patient to obtain echo data of the patient;

a first memory means in which said echo data are to be written by being identified with addresses represented by a polar coordinate system;

a second memory means in which said echo data read out from said first memory means are to be written according to first addresses represented by a rectangular coordinate system;

means for sequentially generating said first rectangular coordinate addresses, said first rectangular coordinate addresses being used when said echo data are written into said second memory means; and address converting means for converting said first rectangular coordinate addresses generated by said address generating means into said polar coordinate addresses, said address conversion being carried out based upon addresses of a representative region which is one of a plurality of regions of a second rectangular coordinate system which is obtained by converting said first rectangular coordinate system so as to correspond to said polar coordinate system, in which said plurality of regions of said second rectangular coordinate system correspond to a plurality of regions of said polar coordinate system and adjacent regions have line symmetry relationship with each other, and region discriminating information which discriminates which of said plurality of regions said representative region belongs to;

whereby said echo data are read out from said first memory means in accordance with said converted polar coordinate addresses which are supplied from said address converting means, and thus readout echo data are written into said second memory means.

12. The diagnostic ultrasound apparatus as claimed in claim 11, wherein said plurality of regions include four regions.

13. The diagnostic ultrasound apparatus as claimed in claim 11, wherein said plurality of regions include eight regions.

14. The diagnostic ultrasound apparatus as claimed in claim 11, wherein said plurality of regions include two regions.

15. The diagnostic ultrasound apparatus as claimed in claim 14, wherein said ultrasound probe is constituted into a sector scanning use.

16. The diagnostic ultrasound apparatus as claimed in claim 14, wherein said ultrasound probe is constituted into a convex scanning use.

17. A diagnostic ultrasound apparatus, comprising:

an echo data memory in which echo data in a scanning plane obtained by performing a radial scan with an ultrasound beam are to be written by being identified with addresses S, B represented by a polar coordinate system;

a frame memory in which said echo data which are rearranged so as to meet with a display image corresponding to said scanning plane are to be written by being identified with addresses X, Y represented by a rectangular coordinate system;

an address generator for sequentially generating said addresses X, Y for writing said echo data into said frame memory;

a quadrant discriminating means for discriminating a quadrant to which specified X, Y addresses belong to, said quadrant being one of a plurality of quadrants which constitute said scanning plane in which adjacent quadrants have line symmetry relationship with each other;

a prepositioned converting means for converting said addresses X, Y into another rectangular coordinate addresses x, y which are addresses of a representative quadrant in said plurality of quadrants;

an address conversion table for converting said address x, y of the representative quadrant into polar coordinate addresses R, θ of the corresponding quadrant of the polar coordinate system; and a second address converting means for converting said polar coordinate addresses R, θ into said polar coordinate addresses S, B based upon the discriminated quadrant information provided by said quadrant discriminating means, to output said addresses S, B to said echo data memory.

18. An ultrasound diagnostic apparatus, comprising:

an ultrasound probe for radially transmitting and receiving ultrasound waves to and from a patient to form a circular scanning plane which are divided into four quadrants and obtain echo data of the patient from said scanning plane;

a first memory means in which said echo data are to be written according to addresses represented by a polar coordinate system;

a second memory means in which said echo data read out from said first memory means are to be written according to addresses represented by a rectangular coordinate system;

means for generating said rectangular coordinate addresses for writing said echo data into said second memory; and means for reading out said echo data in said first memory means in a predetermined order so as to be able to produce a circular scanning image corresponding to said scanning plane on said second memory means, said reading out means including means for converting said rectangular coordinate addresses into said polar coordinate addresses, in which the corresponding relationship between the rectangular coordinate addresses and the polar coordinate addresses only for a common representative quadrant which is one of said quadrants is calculated, and the corresponding relationship between the rectangular coordinate addresses and the polar coordinate addresses for the other quadrants are obtained based upon the calculated result and line symmetry relationship between said representative quadrant and each of the other quadrants, whereby according to the generation of said rectangular coordinate addresses by said address generating means, the echo data stored in said first memory means corresponding to the generated rectangular coordinate addresses are sequentially read out from said said first memory means.

* * * * *